United States Patent
Gupte et al.

(10) Patent No.: US 10,212,050 B2
(45) Date of Patent: Feb. 19, 2019

(54) PROVIDING RECURSIVELY-GENERATED INSTANTIATED COMPUTING RESOURCE IN A MULTI-TENANT ENVIRONMENT

(71) Applicant: ENTIT SOFTWARE LLC, Sanford, NC (US)

(72) Inventors: Prashant Gupte, Sunnyvale, CA (US); Matthew S. Newman, Sunnyvale, CA (US); Stephane H. Maes, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 270 days.

(21) Appl. No.: 14/914,280

(22) PCT Filed: Sep. 4, 2013

(86) PCT No.: PCT/US2013/058036
§ 371 (c)(1),
(2) Date: Feb. 25, 2016

(87) PCT Pub. No.: WO2015/034484
PCT Pub. Date: Mar. 12, 2015

(65) Prior Publication Data
US 2016/0218938 A1   Jul. 28, 2016

(51) Int. Cl.
G06F 15/173 (2006.01)
H04L 12/24 (2006.01)
G06F 9/50 (2006.01)

(52) U.S. Cl.
CPC ........ *H04L 41/5025* (2013.01); *G06F 9/5011* (2013.01); *G06F 9/5072* (2013.01); *H04L 41/5038* (2013.01)

(58) Field of Classification Search
CPC ............. H04L 41/5025; H04L 41/5038; G06F 9/5011; G06F 9/5072
See application file for complete search history.

(56) References Cited

U.S. PATENT DOCUMENTS 8,495,570 B2   7/2013  Fortune et al.
2009/0228950 A1   9/2009  Reed et al.
(Continued)

FOREIGN PATENT DOCUMENTS

CN   102541638   7/2012
CN   102681899   9/2012
(Continued)

OTHER PUBLICATIONS

Chapman, C. et al., Software Architecture Definition for On-demand Cloud Provisioning, Sep. 12, 2010, 21 pages, http://www.ee.ucl.ac.uk/~sclayman/docs/ClusterComp2011.pdf.
(Continued)

*Primary Examiner* — John B Walsh

(57) ABSTRACT

Apparatus and methods for providing computing resources are provided. More particularly, providing recursively-generated instantiated computing resource in a multi-tenant environment are provided. According to one example, a non-transitory computer-readable medium can store a set of instructions executable by a processing resource to instantiate a first instance of a first computing resource and provide the first instance of the first computing resource to a first tenant of a plurality of tenants utilizing a computing system. A second computing resource can be provided to a second tenant of the plurality of tenants when the second computing resource is available and sharable with the second tenant. A second instance of the first computing resource can be recursively-generated responsive to the request from the second tenant when the second computing resource is not available or the second computing resource is not sharable with the second tenant.

20 Claims, 7 Drawing Sheets

(56) References Cited

U.S. PATENT DOCUMENTS

| | | |
|---|---|---|
| 2009/0288084 A1 | 11/2009 | Astete et al. |
| 2010/0198730 A1 | 8/2010 | Ahmed et al. |
| 2011/0137805 A1 | 6/2011 | Brookbanks et al. |
| 2011/0231853 A1 | 9/2011 | Murray et al. |
| 2011/0289479 A1 | 11/2011 | Pletter et al. |
| 2012/0042311 A1* | 2/2012 | Biran .................. G06F 9/45558 718/1 |
| 2012/0144041 A1 | 6/2012 | Lee et al. |
| 2012/0185913 A1 | 7/2012 | Martinez et al. |
| 2012/0324092 A1 | 12/2012 | Brown et al. |
| 2012/0331524 A1 | 12/2012 | Mower et al. |
| 2013/0007272 A1 | 1/2013 | Breitgand et al. |
| 2013/0036213 A1 | 2/2013 | Hasan et al. |
| 2013/0060933 A1 | 3/2013 | Tung et al. |
| 2013/0066945 A1 | 3/2013 | Das et al. |
| 2013/0139172 A1 | 5/2013 | An et al. |
| 2013/0247034 A1* | 9/2013 | Messerli ............. G06F 9/45533 718/1 |
| 2014/0101299 A1* | 4/2014 | Cherel .................... G06F 9/468 709/223 |
| 2014/0137182 A1* | 5/2014 | Elzur ..................... H04L 63/20 726/1 |

FOREIGN PATENT DOCUMENTS

| | | |
|---|---|---|
| CN | 102835068 | 12/2012 |
| WO | WO2014007810 | 1/2014 |
| WO | WO2014088544 | 6/2014 |
| WO | WO2015034481 | 3/2015 |
| WO | WO2015034484 | 3/2015 |
| WO | WO2015034485 | 3/2015 |
| WO | WO2015034487 | 3/2015 |

OTHER PUBLICATIONS

Cisco Systems, Inc., Glue Networks Deployment Guide for the Cisco Next-generation WAN, May 1, 2013, 29 pages, http://www.cisco.com/en/US/docs/solutions/Enterprise/WAN_and_MAN/GlueNtwksDepGuide.pdf.

International Search Report and Written Opinion, PCT Patent Application No. PCT/US2013/058036, Jun. 9, 2014, 14 pages.

Mietzner, R. et al., Towards Provisioning the Cloud: On the Usage of Multi-Granularity Rows and Services to Realize a Unified Provisioning Infrastructure for SaaS Applications, IEEE Congress on Services, Jul. 6-11, 2008, 8 pages.

Tsai, W-T et al., Service-oriented Cloud Computing Architecture, 2010 7th International Conference on information Technology, Apr. 12-14, 2010, 10 pages.

VMware, Inc., VMware vCloud ® Architecture Toolkit Operating a VMware vCloud, Oct. 2011, 92 pages http://www.vmware.com/files/pdf/vcat/Operating-VMware-vCloud.pdf.

* cited by examiner

PROVIDING RECURSIVELY-GENERATED INSTANTIATED COMPUTING RESOURCE IN A MULTI-TENANT ENVIRONMENT

CROSS-REFERENCE TO RELATED APPLICATION

This application is a U.S. National Stage Application of and claims priority to International Patent Application No. PCT/US2013/058036, filed on Sep. 4, 2013, and entitled "PROVIDING RECURSIVELY-GENERATED INSTANTIATED COMPUTING RESOURCE IN A MULTI-TENANT ENVIRONMENT".

BACKGROUND

A cloud service generally refers to a service that allows end recipient computer systems, e.g., thin clients, portable computers, smart phones, desktop computers, other applications, services or systems, to access a pool of hosted computing and/or storage resources, e.g., the cloud resources over a network such as the Internet, for example. In this manner, the host, a cloud service provider, may, for example, provide Software as a Service (SaaS) by hosting applications, Infrastructure as Service (IaaS) by hosting equipment (servers, storage components, network components, etc.), or a Platform as a Service (PaaS) by hosting a computing platform (operating system, middleware, data bases, autoscaling infrastructure, etc.).

A cloud service can incur charges on a demand basis, such as during provisioning or lifecycle management (for a private cloud service there may, or may not, be meterings and accounting charges allocated). The cloud service can be managed by a cloud service provider and may be scaled by an end user, e.g., according to desired storage capacity, processing power, network bandwidth, etc. The cloud service may be a public service or a limited access private service that is provided over a private network, e.g., a business enterprise network. The cloud service may be a managed cloud service, private or hosted, such as a virtual private cloud service, or may be a hybrid cloud service that is a combination of various configurations and services. Traditionally, when a user develops a cloud service, the user may perform various actions related to deploying and configuring computing resources associated with the ordered cloud service such as deployment of virtual machines (VMs), middleware, application software, and application components) on the provisioned/instantiated infrastructure.

DETAILED DESCRIPTION

Figure 1:
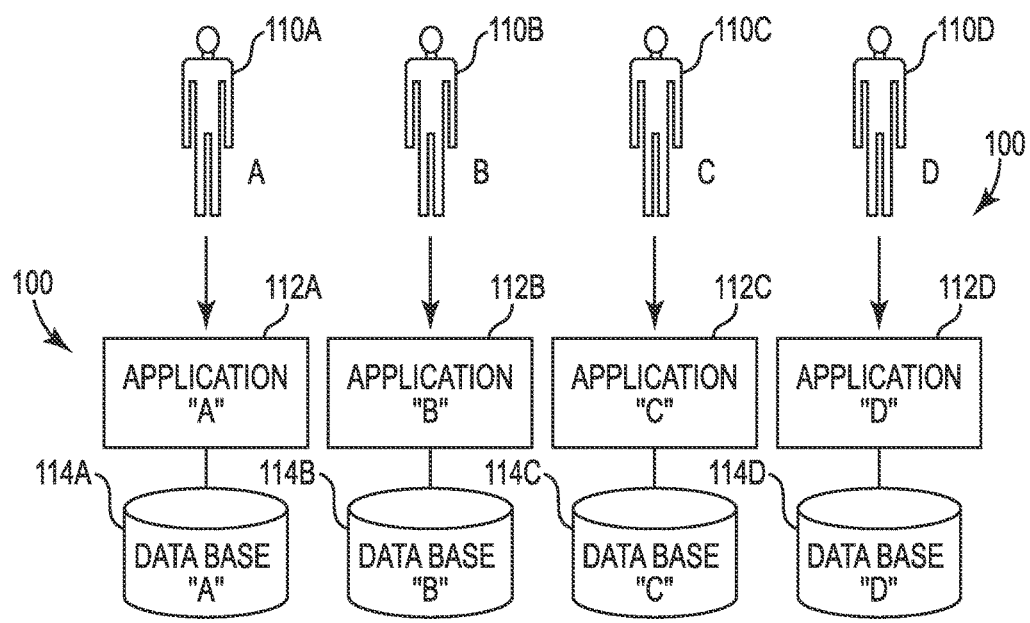
FIGS. 1 and 2 illustrate diagrams of multi-tenancy models according to one or more previous approaches.

In a cloud-based computing environment, computing resources of a computing system can be shared. A requested computing service can be created using various available computing resources. That is, computing resources are the building blocks used in creating a requested computing service. The computing resources used in creating a computing service can be created if requisite computing resources did not previously exist, or shared in some manner if the needed computing resources already do exist (and are available for sharing). For example, an existing computing resource might be shared directly, or instantiated to create another instance of a particular computing resource for use as part of the requested computing service.

One method of instantiating a computing resource is to recursively generate the instantiated computing resource. Recursive creation of computing resources can be applied to provisioning computing services, as well as in lifecycle management of computing services. Lifecycle management of computing services can include retiring computing services when no longer needed, which can free-up a computing resource to share with other computing service(s), or cause the computing resource to be retired, e.g., as no longer needed.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 2:
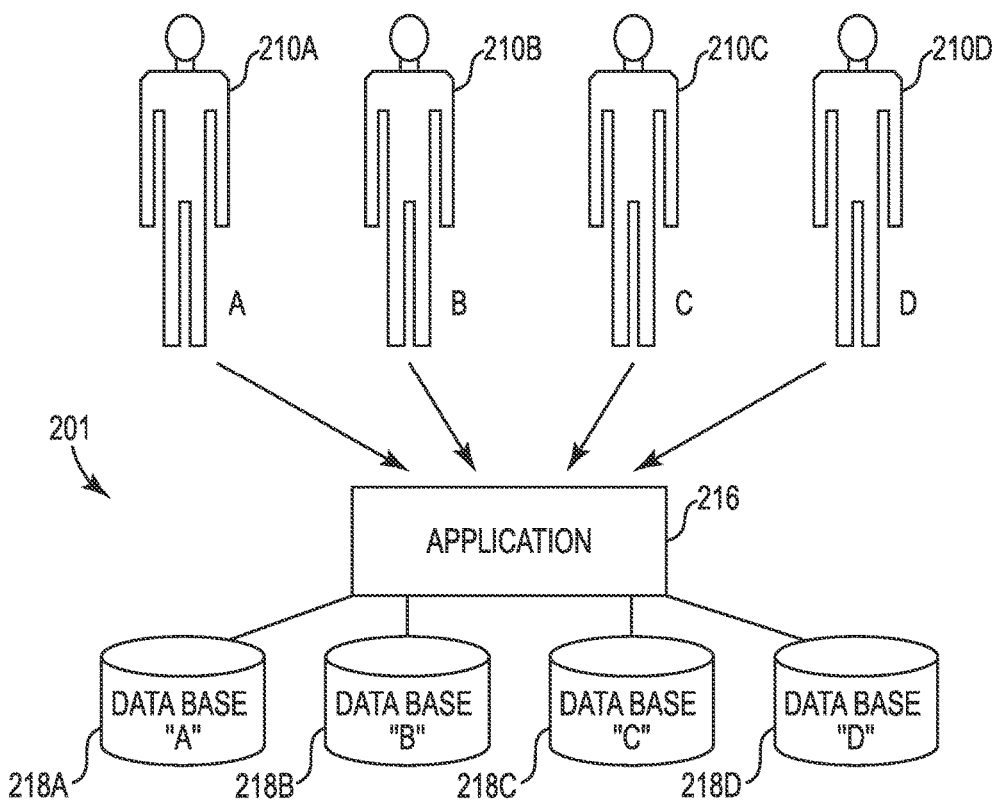

FIGS. 1 and 2 illustrate diagrams of multi-tenancy models according to a previous approach. In cloud-based computing environments a computing system can be used by a single tenant or shared by multiple tenants. As used herein, tenancy refers to a single tenant, e.g., entity, organization, etc., and multi-tenancy refers to multiple tenants sharing a computing system in some manner.

Where an entire computing system, such as a cloud-based computing system, is dedicated to a single tenant, all computing resources of the computing system are available to the single tenant and consideration of sharing computing resources with other tenants is not necessary. However, where a computing system is shared among multiple tenants, the use, e.g., sharing, of computing resources of the computing system, careful consideration is given to efficiency and security criteria, among others.

FIG. 1 illustrates one previous approach for sharing computing resources of a computing system serving multiple tenants. A multi-tenant computing system, e.g., cloud based computing system, can be implemented in a variety of ways. FIG. 1 shows a multi-tenant computing system 100 serving multiple tenants 110A-D with segregated and isolated use of the computing system 100. As shown in FIG. 11, each of the multiple tenants 110A-D are running a respective dedicated application 112A-D and utilizing dedicated computing resource(s) 114A-D, e.g., dedicated data bases A-D for storing respective tenant information therein.

More particularly, computing resources of the computing system can be shared by dedicating portions of the computing resources to respective single tenants. For example, tenant 110A may have sole use of application "A" 112A and database "A" 114A, tenant 110B may have sole use of application "B" 112B and database "B" 114B, tenant 110C may have sole use of application "C" 112C and database "C" 114C, and tenant 110D may have sole use of application "D" 112D and database "D" 114D. While computing resources of the computing system are shared by dedicating portions of the computing resources to individual tenants, a particular computing resource is not shared among multiple tenants. Dedicating a portion of the computing resources to an individual tenant is based on one monolithic instance per tenant.

FIG. 2 illustrates another previous approach for sharing computing resources of a computing system serving multiple tenants. A multi-tenant computing system 201, e.g., cloud based computing system, can be implemented in a variety of ways. FIG. 2 shows a multi-tenant computing system 201 serving multiple tenants 210A-D with shared use of an application 216 but segregated and isolated use of other computing resources. As shown in FIG. 2, each of the multiple tenants 210A-D are running a same application 216 and utilizing dedicated computing resource(s) 218A-D, e.g., dedicated databases A-D for storing respective tenant information therein.

More particularly, computing resources of the computing system 201 can be shared by dedicating some, but not all, portions of the computing resources to respective single tenants. For example, tenant 210A may have sole use of database "A" 218A, tenant 210B may have sole use of database "B" 218B, tenant 210C may have sole use of database "C" 218C, and tenant 210D may have sole use of database "D" 218D. While computing resources of the computing system are shared by dedicating portions of the computing resources to individual tenants, a particular computing resource is not shared among multiple tenants. Dedicating a portion of the computing resources to an individual tenant is based on one monolithic instance per tenant.

Figure 3:
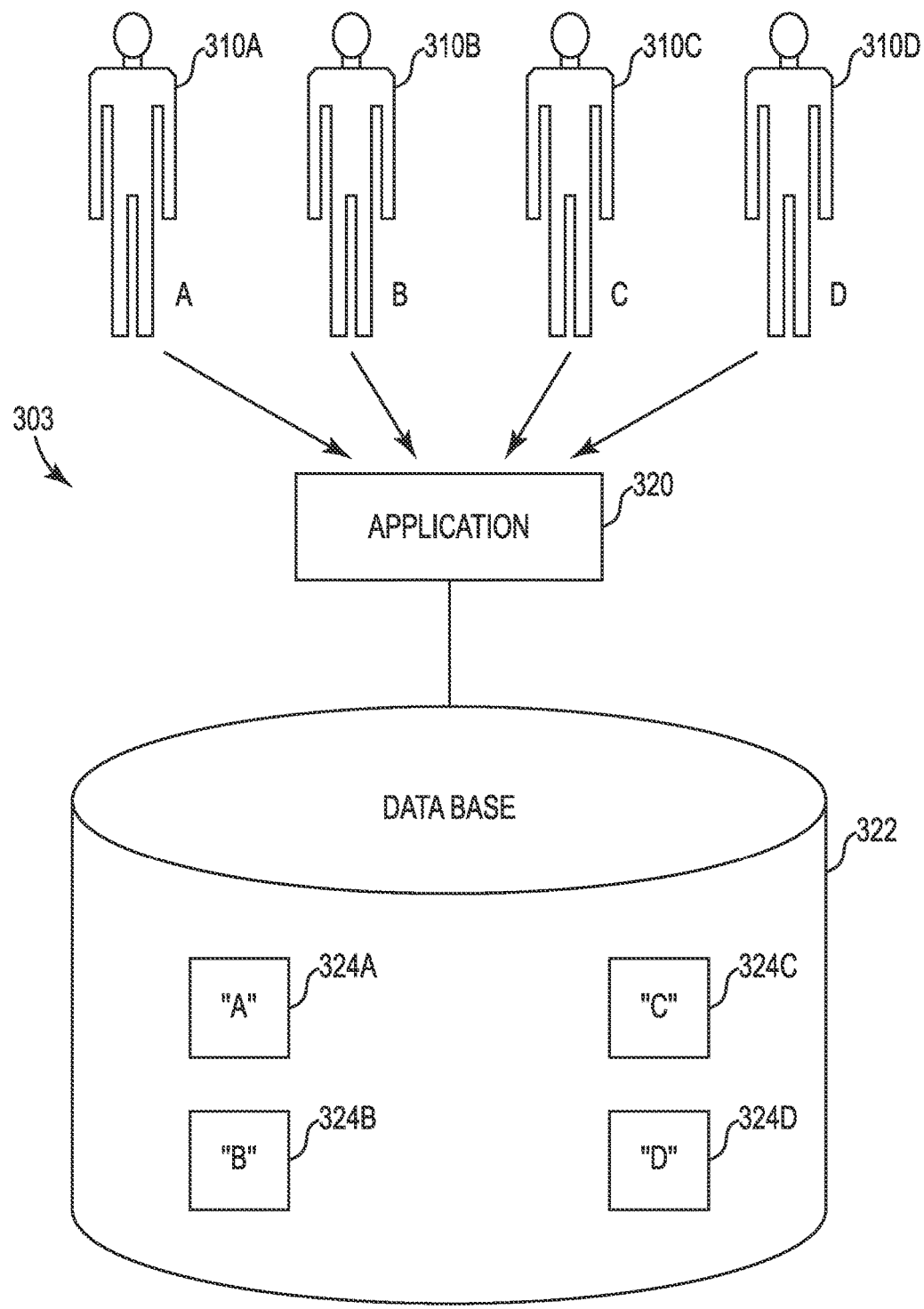
FIG. 3 illustrates a diagram of a multi-tenancy model according to the present disclosure.

FIG. 3 illustrates a diagram of a multi-tenancy model according to the present disclosure. FIG. 3 illustrates an approach for sharing computing resources of a computing system 303 serving multiple tenants. FIG. 3 shows a multi-tenant computing system serving multiple tenants 310A-D with shared use of an application 320 and shared use of other computing resources, e.g., database 322. As shown in FIG. 3, each of the multiple tenants 310A-D use a same database 322 for storing respective tenant information therein. Respective tenants are provided an instance of database 322 for their own use. For example, tenant 310A may have use of an "A" instance 324A of database 322, tenant 310B may have use of an "B" instance 324B of database 322, tenant 310C may have use of an "C" instance 324C of database 322, and tenant 310D may have use of an "D" instance 324D of database 322. Multiple instances of a same computing resource can be provided via recursive generation for use in a multi-tenant environment. Additional details regarding a method and apparatus for providing a recursively-generated instantiated computing resource in a multi-tenant environment are provided below.

Figure 4:
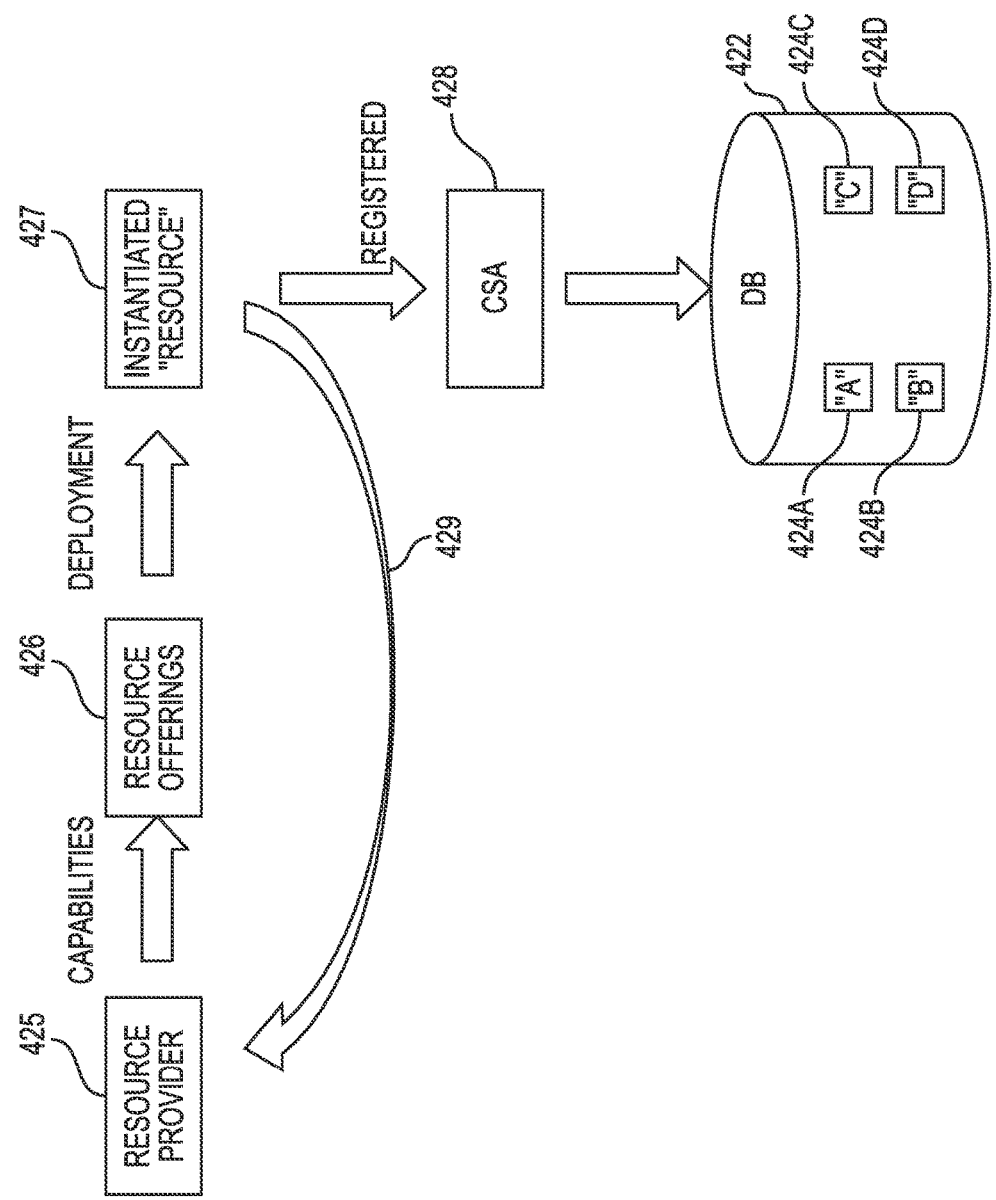
FIG. 4 illustrates a flow diagram of an example of providing a recursively-generated instantiated computing resource in a multi-tenant environment according to the present disclosure.

FIG. 4 illustrates a flow diagram of an example of providing a recursively-generated instantiated computing resource in a multi-tenant environment according to the present disclosure. FIG. 4 shows a computing resource provider 425, computing resource offerings 426, and an instantiated computing resource 427. Not shown is a service design, which is also referred to herein as a blueprint.

An application and/or a user can request a first number of computing resources from a computing resource provider 425. A computing resource provider 425 can be a physical provider and/or a logical provider. For example, a computing resource provider 425 can be an access layer switch that is capable of configuring specific ports to allow network traffic to traverse the specific ports. The access layer switch can be the computing resource provider and the configuration of the specific ports, e.g. closing and/or opening the ports, can be the computing resource that the access layer provides. Other examples of computing resource provider 425 and computing resource(s) can include a virtual center that instantiates virtual machines (VM) and/or a storage automation tool that creates storage containers.

As used herein, a computing resource can be physical computing resources, e.g., the computing system can comprise multiple physical computing devices, each physical device can be an instance of the physical computing resource. Or, computing resources can be virtual computing resources such as instances of a particular type of computing resource, e.g., multiple instances of a virtual server or database etc. can be provided by a physical computing device. When multiple tenants share computing resources of a computing system, physical and/or administrative controls can be used to ensure that instances provided to a tenant, e.g., to a user associated with the tenant per a request, be isolated from access by other tenants (and/or other users and/or requests). The extent of dedication and/or sharing between tenants (and/or other users and/or requests) of computing resources can be defined by policies and/or contractual terms such as a cloud service agreement (CSA). Therefore, various ways can be implemented to manage how the instances are shared and/or isolated.

In order to provide computing resources, a computing system may include a service manager to offer and/or deliver, by instantiation and deployment, computing services to manage the provisioning and lifecycle of computing services for user(s), e.g., of one or more tenants of multiple tenants. Managing the provisioning lifecycle of computing services can include managing the provisioning, e.g., building, of the computing service, ongoing management of an existing computing service, reporting, metering, and/or auditing, for example. More particularly, a service manager can orchestrate the use of application programming interfaces (APIs) of existing computing services for managing the lifecycle of the existing computing services and combinations of the existing computing services for users via computing devices, e.g., desktop computers, portable computers, smart phones, clients, thin clients, servers, etc.

Managing of computing services can also include managing instances of computing resources, such as by updating, copying, moving, and/or retiring computing resources (including instances of computing resources where one or more instances of computing resources are recursively-generated, for example. According to some embodiments of the present disclosure, managing a computer resource includes at least one of updating, copying, moving, and retiring activities.

A computing service provisioning system can include a design component configured to create a computing service, such as a computing service design for capabilities of a cloud-based computing system. Computing service design can include a set of actions to instantiate computing resources, e.g., capabilities of the cloud-based computing system, as well as allocate computing resources from a collection of existing computing resources to one or more of multiple tenants. An instantiation can include an instance of a computing resource, e.g., the computing resource providing a particular capability of the computing system. As such, the instance (of the computing resource) can be a deployed instance, and/or an executed instance, for example.

Depending on a particular implementation, a request for computing services, e.g., selection, ordering, for cloud-based computing system lifecycle management services, for example, may be performed by a particular user, e.g., administrator, for one or more other users, e.g., of a tenant, or by a user for the user's own use. A user of the service manager may select and order computing services, e.g., capabilities of a cloud-based computing system, through the service manager. Computing services, as used herein, refers to existing computing services, including combinations of existing computing services, can be provided by existing computing resources, e.g., cloud resources, and lifecycle management services that can be offered and delivered by the computing service manager.

The available computing services of a cloud-based computing system define the capabilities of the cloud-based computing system. A cloud-based computing system can be a distributed computing system, which may or may not be interconnected by a network. A cloud-based computing system (also referred to informally as a "cloud") may be a public cloud, e.g., formed using a public network such as the Internet, can provide hosted computing services to members of the public, a private cloud, e.g., formed using a private, limited access network can provide hosted computing services to a limited group of users, a virtual private cloud, e.g., formed using a public network providing hosted computing services to a limited group of members of the public, and/or a hybrid cloud, e.g., formed using a combination of two or more of the aforementioned clouds). Examples of clouds, in accordance with the present disclosure, are not so limited, however, and a cloud may include different types of, and/or combinations of, distributed computing systems.

Individual computing resources, e.g., server, storage, network, security, application install, etc., are the building blocks from which a computing service is created. Various computing resources can be combined logically and physically. For example, a server and database can be combined with a web server and/or application server. Computing resources can be created by computing resource providers. Computing resource providers can deploy, e.g., executed, computing resources responsive to a request by a user. Deployed computing resources can include software as a service (SaaS). When using SaaS, an entity may not acquire a license for the software nor arrange for it to be installed, hosted and managed. Such responsibilities can be performed by the organization offering the SaaS. In a previous example of a SaaS application, users can be groups of employees of a particular organization and that organization can be known as a tenant. The organization can be known as the owner of the application and the users can all share the application.

The computing resource provider 425 type can be defined with its capabilities as computing resource offerings 426 that an application can invoke in an instantiated computing resource 427. Computing resource offerings 426 are capabilities that are associated with an instantiated computing resource 427. Capabilities can include creating and/or modifying the instantiated computing resource 427. Capabilities can include starting and/or stopping the instantiated computing resource 427, among other capabilities. As used herein, the term "capabilities" is intended to be inclusive. Capabilities are specific to the instantiated computing resource 427. For example, if an instantiated computing resource 427 is a database, then capabilities can include creating a database, populating the database, modifying the database, and/or restructuring the database, among other capabilities associated with a database.

After the number of computing resource offerings 426 are identified, a service design can be created. The service design can be a topology that allows the application access to the instantiated computing resource 427. From the service design, computing resource offerings 426 can be deployed as an instantiated computing resource 427.

An instantiated computing resource 427 can be an instantiation of a computing resource comprising the requested computing resource. The instantiated computing resource 427 can be created based on a number of specifications that are provided with the request for computing resources made by the application. Examples of the instantiated computing resource 427 can include an operating system, a server, and/or a network connection, among other examples of the instantiated computing resource 427. In a number of examples, an instantiated computing resource 427 can perform a number of logical and/or hardware functions. The instantiated computing resource 427 can consume a number of computing resources, e.g., hardware and/or logical computing resources. For example, an instantiated computing resource 427 that is a server can consume a number of memory resources to provide a number of functions.

In previous approaches, a number of different computing resources are consumed by different instantiated computing resources 427. For example, an application can request a first server and the computing resource provider 425 can create an instantiated computing resource 427 that is a first server that consumes a first memory, a first number of network connections, and a first operating system, among other computing resources. The application can request a second server and the computing resource provider 425 can create an instantiated computing resource 427 that is a second server. The second server can consume a second memory, a second number of network connections, and a second operating system. That is, in previous approaches, a new set of computing resources can be reserved for an instantiated computing resource each time a new computing resource is instantiated. As such, a second number of computing resources can be reserved for the second instantiated computing resource even through a first number of computing resources that are reserved for the first instantiated computing resource are underutilized.

According to one or more embodiments of the present disclosure, a recursively-generated instantiated computing resource in a multi-tenant environment can be provided. According to one example, a first instance of a first computing resource can be instantiated and provided to a first tenant of a plurality of tenants utilizing a computing system. A second computing resource can be provided to a second tenant of the plurality of tenants when the second computing resource is available and sharable with the second tenant. A second instance of the first computing resource can be recursively-generated responsive to the request from the second tenant when the second computing resource is not available or the second computing resource is not sharable with the second tenant. The second instance of the first computing resource can then be provided to the second tenant.

Alternatively stated, a request can be processed for a computing service from a user of a first tenant of a plurality of tenants utilizing a computing system. A first computing resource can be provided to the first tenant. A second request can be processed for a second computing service from a user of a second tenant of the plurality of tenants utilizing the computing system. A second computing resource can be provided to the second tenant when the second computing resource is available and sharable with the second tenant, and/or an instance of the first computing resource can be instantiated responsive to the second request from the user of the second tenant when the second computing resource is not available or the second computing resource is not sharable with the second tenant. The second computing resource and/or the instance of the first computing resource can be provided to the second tenant.

A newly instantiated instantiated computing resource 427 can be registered in the CSA 428 as an instance of that resource provider 425, and thereafter made available to users. A newly instantiated instantiated computing resource 427 can also be used as a new recursively-generated resource provider 425, as shown at 429. Enabling a deployed computing service to be used as a building block for abstract service uses capabilities of the instantiated computing resource 427, e.g., deployed service component. Any abstract service can "use" a newly created provider once it is registered and ready for consumption. The instantiated computing resource 427, e.g., service component, can serve as a building block computing resource provider 425 for the abstract service. That is, an instantiated computing resource 427 is a slice of the computing resource that can be provided per tenant in a multi-tenant environment.

As discussed with respect to FIG. 3, a multi-tenant computing system can serve multiple tenants by shared use of an application (not shown in FIG. 4) and shared use of other computing resources, e.g., database 422. Each of the multiple tenants can use a same database 422 for storing respective tenant information therein, each respective tenant being provided an instance, e.g., 424A, 424B, 424C, and 424D, of database 422 for their own use, as previously described with respect to FIG. 3. For example, a first tenant (of multiple tenants) may have use of an "A" instance 424A of database 422, a second tenant may have use of a "B" instance 424B of database 422, a third tenant may have use of a "C" instance 424C of database 422, and a fourth tenant may have use of a "D" instance 424D of database 422, and so on. Multiple instances of a same computing resource can be provided via recursive generation for use in a multi-tenant environment.

A user can request a first number of computing resources through an application. A computing resource provider can instantiate the computing resources. The user can subsequently request a second number of computing resources. The second number of computing resources can be instantiated by the instantiated computing resources that function as a different computing resource provider to conserve computing resources. The first number of computing resources can be divided, e.g., partitioned, to conserve computing resources rather than allocating a different number of computing resources. As such, the first number of computing resources and the second number of computing resources can share computing resources and can be isolated.

As used herein, a user can be a customer and/or an application through which a customer is making a number of requests. An application refers to machine-readable instructions, e.g., software, firmware, etc., that can be run on hardware processor, memory, etc., to process a number of requests and forward the requests through a network to a computing resource provider. A computing resource can be physical computing resources and/or logical computing resources. For example, a computing resource can include Software as a Service (SaaS), Infrastructure as a Service (IaaS), and/or Platform as a Service (PaaS). Other examples of computing resources are discussed in conjunction with the figures.

The instantiated computing resource 427 can provide a number of functions to an application that requested the instantiated computing resource 427. In a number of examples, the instantiated computing resource 427 can be partitioned to create the instantiated computing resource provided to a user and the new computing resource provider 425. For example, instantiated computing resource 427 can be a database. The database can be partitioned such that instantiated computing resource 427 can be a schema supported by the database. As such, computing resources that the database 422 uses can be partitioned and divided between multiple instantiated computing resource 427 to provide isolated user access to the database and/or the schemas associated with the database. That is, the instantiated computing resource 427 can be a partition of the database without requiring that new computing resources be allocated to support a different database. Using a single database to provide instantiated computing resources 427 can conserve computing resources over creating two different databases particularly if the two different databases are underutilized.

The instantiated computing resources 427 can be partitioned by the computing resource provider 425. One instantiated computing resource 427 can be and/or act as a new computing resource provider 425, as previously discussed. In a number of examples, a first instantiated computing resource 427 can be independent of computing resource provider 425 and/or a second instantiated computing resource 427 can be included in the computing resource provider 425.

Registering the instantiated computing resource 427 and/or computing resource provider 425 can include registering the capabilities and/or functions associated with one or more instantiated computing resources 427. Registering the computing resource provider 425 can include registering a type of the computing resource provider 425 or a type of the instantiated computing resources 427. For example, a type can be a database, a server, a network connection, and/or other descriptions of instantiated computing resources 427. Registering can further include registering a number of parameters that further describe the instantiated computing resource(s) 427. For example, a parameter can be a structural query language (SQL) among other parameters that describe the computing resource provider 425 that can instantiate an instantiated computing resource 427, e.g., a database.

Registering the computing resource provider 425 and/or computing resource 427 can also include registering a number of commands that are associated with the instantiated computing resource(s) 427. Commands associated with the instantiated computing resource(s) 427 can be commands that are used by an application to communicate with the instantiated computing resources 427.

Figure 5:
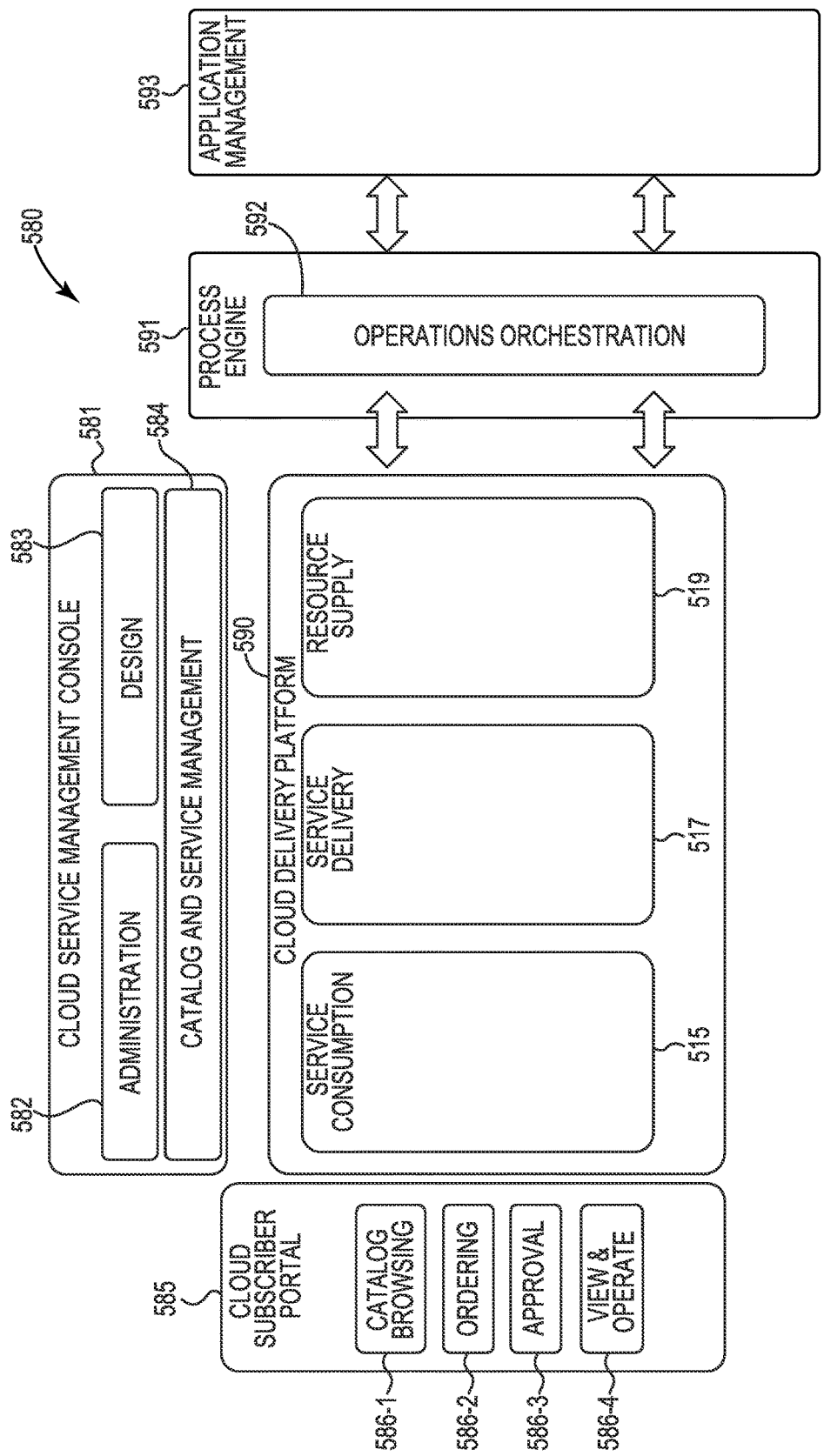
FIG. 5 is a diagram of an example environment for selecting computing resources for a cloud service provisioning system according to the present disclosure.

FIG. 5 is a diagram of an example environment 580 for selecting computing resources for a cloud service provisioning system according to the present disclosure. In a number of examples, policy based selection of computing resources for a cloud service can be implemented in a cloud service management system (e.g., HP Cloud Service Automation (CSA 3.2), for instance). The cloud service management system can orchestrate the deployment of compute and infrastructure computing resources and complex multi-tier application architectures or any other cloud service described by a blueprint and/or service design. In a number of examples, the cloud service management system can include a catalog-based subscription process. For instance, a subscriber can request particular cloud service offerings to be implemented in a cloud service. In some examples, a subscriber can modify predefined cloud service offerings, wherein the predefined cloud service offerings include pricing and other customer-specific features.

According to a previous approach, orchestrators, while functionally sufficient for SaaS deployments, cannot meet the more-complex criteria for deployment in a multi-tenancy environment. Using the recursive instantiated computing resources 427, e.g., computing service components, as a resource provider 425 for a broker can extend functionality of an orchestrator to be able to model multi-tenant application deployment. Implementing recursive usage of instantiated computing resources 427, e.g., computing service components, can extend node-relationship to realized plans, such that orchestration can be expressed as combinations of actions expressed as workflow, e.g., CSA blueprints, or as topologies. In this manner, service design abstraction can be enhanced, and single tenant computing services can be implemented more complexly as computing services in a multi-tenant environment.

Enhancing the orchestrator to be capable of optimally managing a multi-tenant application where the application itself is not multi-tenant, or the application is a composite set of computing resources (or application building blocks), which themselves are not multi-tenant, or the resultant application (or building block) are multi-tenant. Implementation of recursive use of instantiated computing resources 427, e.g., computing service components, as resource providers 425, provide a number of advantages including decencies across instantiated computing resources 427 or applications as computing service components, e.g., building blocks, with context from abstract computing service is implicitly maintained. Also, the upward and downward dependencies govern and maintain the resource pools of building blocks.

As shown in FIG. 5, a cloud service management system 580 can include a number of different architectural components. For instance, the cloud service management system can include a cloud service management console 581, a cloud subscriber portal 585, a cloud delivery platform 590, a process engine module 591, and a number of application management modules 593.

The cloud service management console 581 can include hardware and/or a combination of hardware and programming to perform a number of different functions to manage cloud services. For instance, the cloud service management console 581 can perform administrative functions using an administration module 582, design functions using a design module 583, and/or management functions using a catalog and service management module 584. The cloud subscriber portal 585 can include hardware and/or a combination of hardware and programming to perform a number of different functions supporting a cloud subscriber. For example, the cloud subscriber portal 585 can perform functions allowing a cloud subscriber to browse a cloud service catalog (e.g., using a catalog browsing module 586), order cloud services (e.g., using an ordering module 587), approve cloud service offerings (e.g., using an approval module 588), and/or view subscriptions (e.g., using a view and operate module 589).

The cloud delivery platform 590 can include hardware and/or a combination of hardware and programming to perform a number of different functions to deliver cloud services. For instance, the cloud delivery platform 590 can include a service consumption sub-module 515 including information on cloud service pricing, a catalog of cloud services available, a number of offerings, and/or subscriptions to cloud services. Similarly, the cloud service delivery platform 590 can include a service delivery sub-module 517 that can include information on service blueprints, cloud service components, instances, and/or bindings. Further, the cloud service delivery platform 590 can include a computing resource supply sub-module 519 that can include information on computing resource pools, cloud service providers, cloud service offerings, and/or cloud service subscriptions.

In a number of examples, the cloud management system 580 can include a process engine 591. The process engine 591 can include hardware and/or a combination of hardware and programming to orchestrate cloud service management operations (e.g., using an operations orchestration module). For instance, unlike other cloud service management systems, process engine 591 can implement policy based selection of computing resources for a cloud service. In some examples, process engine 591 can use a generic computing resource provider to dynamically select service providers based on a number of different policies. Further, the cloud management system 580 can include an application management system 593. The application management system 593 can include hardware and/or a combination of hardware and programming to manage applications.

Figure 6:
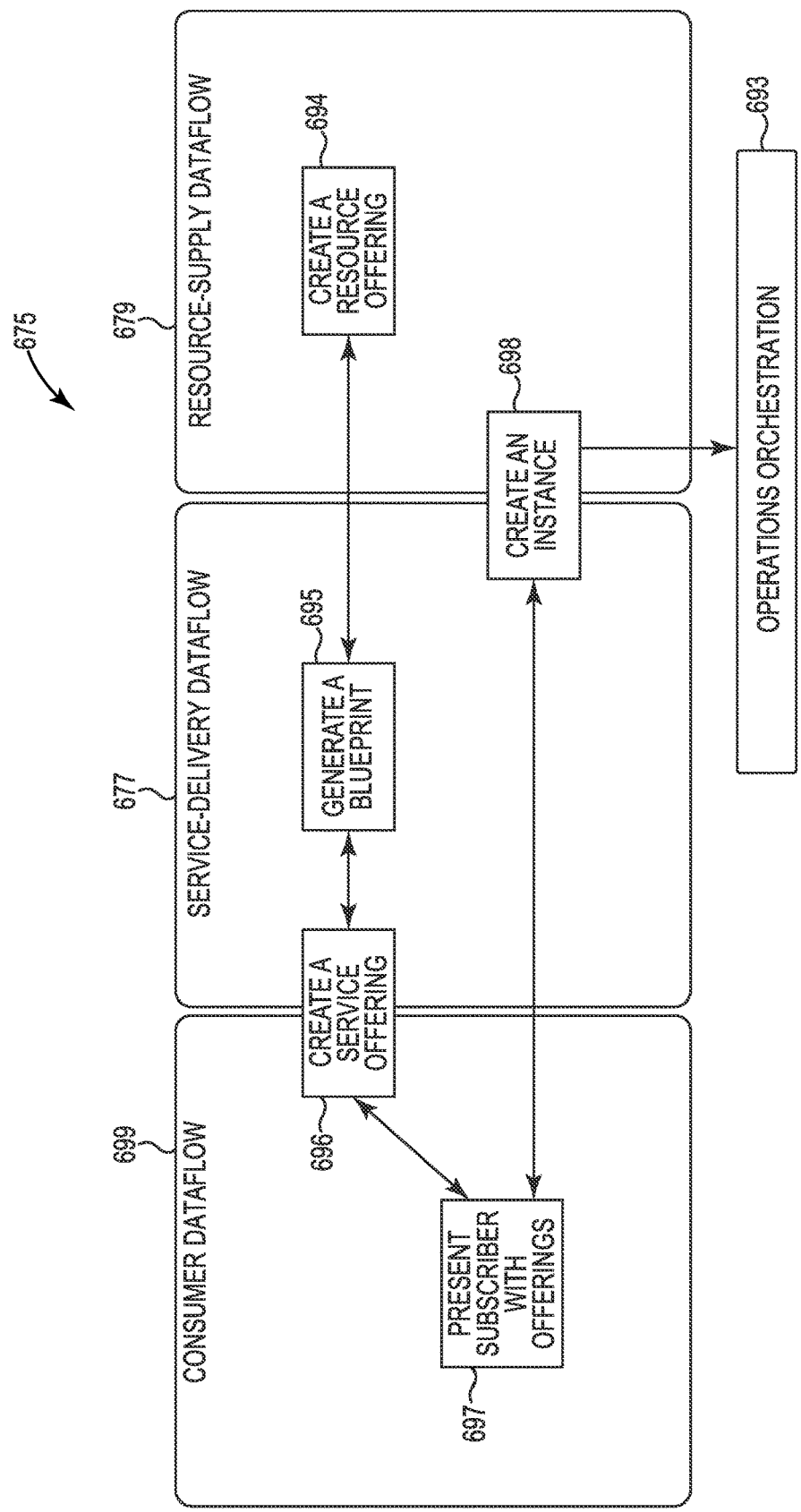
FIG. 6 illustrates a flow chart for selecting computing resources for a cloud service according to the present disclosure.

FIG. 6 illustrates a flow chart for selecting computing resources for a cloud service according to the present disclosure. As shown in FIG. 6, a cloud service management system 675 can manage the flow of information between a subscriber (e.g., via a consumer dataflow 699), a cloud service (e.g., via a service-delivery dataflow 677), and computing resource providers (e.g., via a computing resource-supply dataflow 679). For example, at 694, the cloud service management system 675 can generate a computing resource offering. Generating a computing resource offering can include creating and/or importing computing resource offerings from underlying computing resource providers. At 695, the cloud service management system 675 can generate a service blueprint. Generating a service blueprint can include designing a cloud service, including the configuration, topology, behaviors, computing resource bindings, and/or service options included in the cloud service. At 696, the cloud service management system 675 can create a service offering. Creating a service offering can include defining pricing for the particular cloud service, defining a number of options related to the cloud service, defining default options related to the cloud service, and/or defining SLA documents related to the cloud service, for instance.

At 697, the cloud service management system 675 can present a subscriber with service offerings for review, approval, and subscription. At 6984, the cloud service management system 675 can create an instance of the particular service offerings. Creating an instance of the particular service offerings can include selecting a service component, binding a computing resource to provide the cloud service, and/or generating a computing resource subscription. In a number of examples, the instance of the particular service offering and/or the computing resource subscription for the particular service offerings can be sent to an operations orchestrator 693 for implementation.

In some examples, unlike other cloud service management systems, a generic computing resource provider can be used to select a specific computing resource provider based on a number of policies. For instance, the operations orchestrator can use a rule-based algorithm to select a specific computing resource provider.

Figure 7:
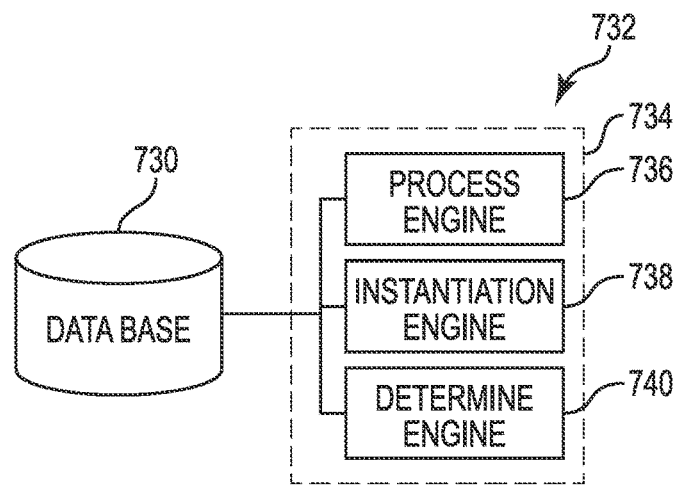
FIG. 7 illustrates a flow diagram of an example of a computing device according to the present disclosure.

FIG. 7 illustrates a diagram of an example of a system for providing computing resources according to the present disclosure. FIG. 7 illustrates a diagram of an example of a system 732 for providing computing resources according to the present disclosure. The system 732 can include a computing system 734, a memory resource 730, e.g., database, and/or a number of engines 736, 738, and 740. The computing system 734 can include the number of engines, e.g., process engine 736, instantiation engine 738, and determination engine 740, etc. The computing system 734 can include additional or fewer engines than illustrated to perform the various functions described herein.

The number of engines can include a combination of hardware and programming that is configured to perform a number of functions described herein, e.g., register an instantiated first computing resource as a computing resource provider, etc. The programming can include program instructions, e.g., software, firmware, etc., stored in a memory resource, e.g., machine readable medium, etc. as well as hard-wired program, and/or logic.

The process engine 736 can include hardware and/or a combination of hardware and programming to receive a request for a computer service including use of a computing resource. In a number of examples, the request can be received at run time. In a number of examples, the request can be processed during development.

The instantiation engine 738 can include hardware and/or a combination of hardware and programming to instantiate a first instance of the computing resource responsive to receiving the request from a first tenant of a computing system having a multi-tenant environment. The instantiation can occur at run time.

The determination engine 740 can include hardware and/or a combination of hardware and programming to register the instantiated first computing resource as a different computing resource provider to provide a second computing resource to a second tenant of the plurality of tenants responsive to a second request for computing service from the second tenant when a second computing resource is available and sharable with the second tenant; or instantiate a second instance of the first computing resource responsive to the second request for computing service from the second tenant when the second computing resource is not available or the second computing resource is not sharable with the second tenant.

Figure 8:
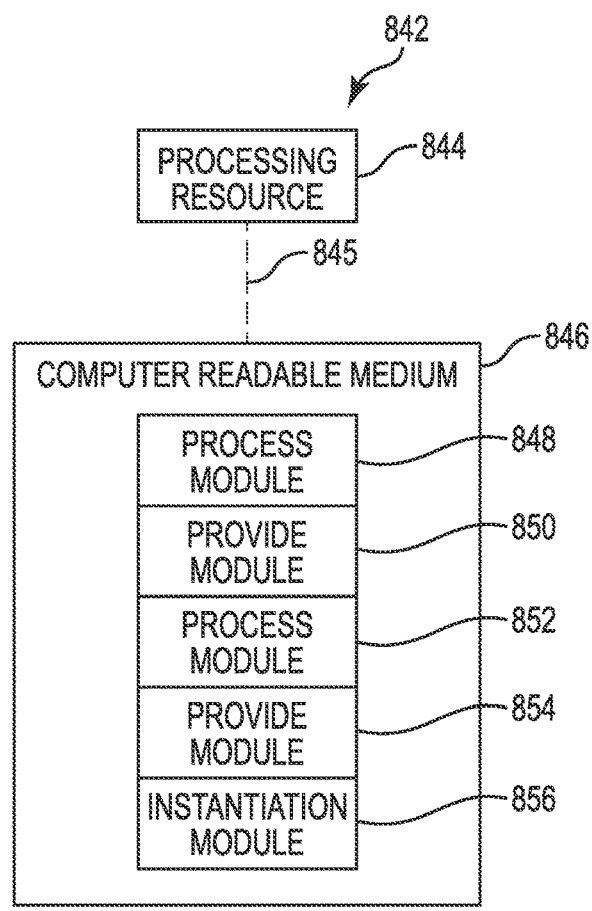
FIG. 8 illustrates a flow diagram of an example of a system for providing a recursively-generated instantiated resource in a multi-tenant environment according to the present disclosure.

FIG. 8 illustrates a diagram of an example of a computing device according to the present disclosure. The computing device 842 can utilize software, hardware, firmware, and/or logic to perform a number of functions described herein.

The computing device 842 can be any combination of hardware and program instructions. The hardware, for example can include a processing resource 844 and/or a memory resource 846, e.g., computer readable medium (CRM), database, etc. A processing resource 844, as used herein, can include any number of processors capable of executing instructions stored by a memory resource 846. The processing resource 844 may be integrated in a single device or distributed across multiple devices. The program instructions, e.g., machine-readable instructions (MRI), can include instructions stored on the memory resource 846 and executable by the processing resource 844 to implement a desired function, e.g., provide a number of computing resources.

The memory resource 846 can be in communication with a processing resource 844. A memory resource 846, as used herein, can include any number of memory components capable of storing instructions that can be executed by processing resource 844. Such memory resource 846 can be a non-transitory CRM. The memory resource 846 may be integrated in a single device or distributed across multiple devices. Further, the memory resource 846 may be fully or partially integrated in the same device as the processing resource 844 or it may be separate but accessible to that device and processing resource 844. Thus, it is noted that the computing device 842 may be implemented on a participant device, on a server device, on a collection of server devices, and/or on a combination of the participant device and the server device.

The memory resource 846 can be in communication with the processing resource 844 via a communication link 845, e.g., path. The communication link 848 can be local or remote to a machine, e.g., a computing device, associated with the processing resource 844. Examples of a local communication link 845 can include an electronic bus internal to a machine, e.g., a computing device, where the memory resource 846 is one of volatile, non-volatile, fixed, and/or removable storage medium in communication with the processing resource 844 via the electronic bus.

A number of modules 848, 850, 852, 854, and/or 856 can include MRI that when executed by the processing resource 844 can perform a number of functions. The number of modules 848, 850, 852, 854, and/or 856 can be sub-modules of other modules. For example, the process module 848 and the provide module 850 can be sub-modules and/or contained within the same computing device. In another example, the number of modules 848, 850, 852, 854, and/or 856 can comprise individual modules at separate and distinct locations, e.g., CRM, etc.

Each of the number of modules 848, 850, 852, 854, and/or 856 can include instructions that when executed by the processing resource 844 can function as a corresponding engine as described herein. For example, the process module 848 can include instructions that when executed by the processing resource 844 can function to process a request for a computing service from a user of a first tenant of a plurality of tenants utilizing a computing system.

In the example of FIG. 8, process module 848 can comprise MRI that are executed by the processing resource 844 to processing a request for a computing service from a user of a first tenant of a plurality of tenants utilizing a computing system. A request can be received from a user via an application. The application can be hosted on a user's computing device. In a number of examples, the application can manage the creation, the use, and/or the recursive generation of a number of instantiated computing resources. The request can be received at a computing resource provider. A request can include a type of instantiated computing resource that is being requested and a number of parameters that further define an instantiated computing resource and/or a computing resource provider.

A provide module 850 can comprise MRI that are executed by the processing resource 844 to provide a first computing resource to the first tenant. Providing can include creating, selecting, and/or identifying the first computing resource, including providing a reference thereto. A reference can include a reference to the first computing resource. A reference can be a link, a pointer, an address, and/or any other means by which the consumer and/or the application can communicate with the first computing resource.

In a number of examples, the first computing resource can be provided to an application. The first computing resource can be provided to the application by creating the first computing resource on the computing device that hosts the application. The first computing resource can be provided to the application by moving the first computing resource to the computing device that hosts the application.

A process module 852 can comprise MRI that are executed by the processing resource 844 to process a second request for a second computing service from a user of a second tenant of the plurality of tenants utilizing the computing system. The second request for a second computing service from a user of a second tenant can be processed in much the same manner as was described above for processing the first request.

A provide module 854 can comprise MRI that are executed by the processing resource 844 to provide a second computing resource to the second tenant when the second computing resource is available and sharable with the second tenant. However, when the second computing resource is not available or not sharable with the second tenant, instantiation module 856 can instantiate an instance of the first computing resource responsive to the second request from the user of the second tenant when the second computing resource is not available or the second computing resource is not sharable with the second tenant. The instance of the first computing resource can be provided to the second tenant instead of the second computing resource.

The instantiated first computing resource can be created from a partition of the first computing resource by partitioning the first computing resource. In a number of examples, the first request, e.g., for computing resource, and the second request, e.g., for computing resource, can originate with a single application and/or can originate from a number of applications that are associated with a same or different users and/or users associated with different tenants of multiple tenants. Furthermore, the first and second requests can originate with a number of different applications that are associated with a number of different tenants.

Figure 9:
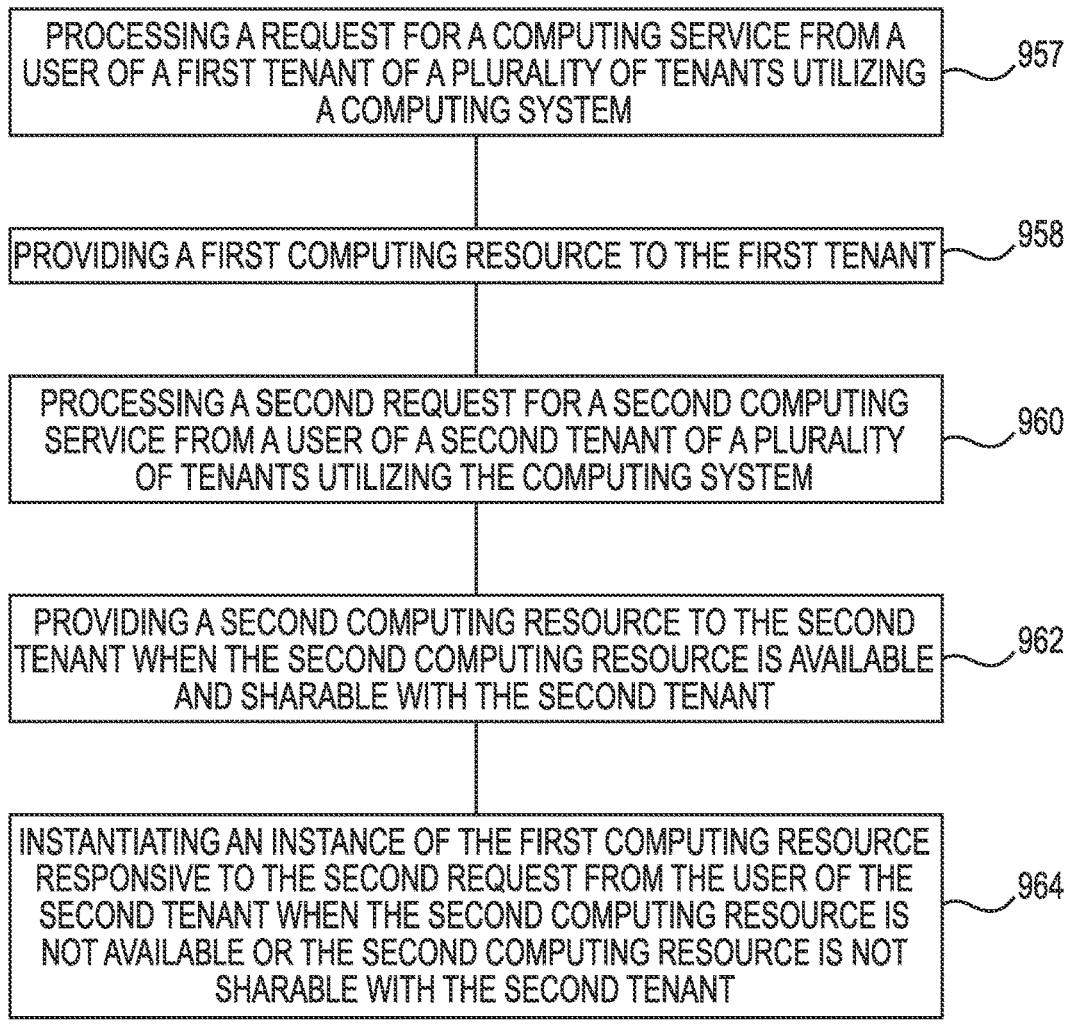
FIG. 9 illustrates a flow diagram of an example of a method for providing a recursively-generated instantiated resource in a multi-tenant environment according to the present disclosure.

FIG. 9 illustrates a flow diagram of an example of a method for providing computing resources according to the present disclosure. At 957, a request can be processed for a computing service from a user of a first tenant of a plurality of tenants utilizing a computing system. Requests can include a request for a particular computing resource. The user may request a particular computing service, which in turn can correspond to a request for a particular computing resource to implement the requested computing service.

At 958, a first computing resource can be provided to the first tenant. At 960, a second request can be processed for a second computing service from a user of a second tenant of the plurality of tenants utilizing the computing system. At 962, a second computing resource can be provided to the second tenant when the second computing resource is available and sharable with the second tenant. Sharable refers to whether a particular computing resource can be shared with a particular tenant according to various physical and/or administrative constraints. As such, a particular computing resource may be provided to the second tenant if the computing resource is not sharable with the second tenant, even if the particular computing resource is available, e.g., to be shared by other tenants with which it is sharable.

A parameter can designate how to provide a requested service based on a tenant associated with the user requesting the service. For example, a tenant associated with a user can have particular security clearance and/or budget allowance for services. Services can be partitioned for the tenant's use based on the security clearance and/or the budget constraints.

The parameter of the resource provider can include a business policy and/or Quality of Service (QoS) parameter associated with the resource provider. A determination can be made whether an already instantiated building block can meet a request that includes a parameter.

At 964, an instance of the first computing resource can be instantiated responsive to the second request from the user of the second tenant when the second computing resource is not available or the second computing resource is not sharable with the second tenant.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A non-transitory computer-readable medium comprising instructions executable by a processing resource to:
   instantiate a first instance of a first computing resource deployed by a computing resource provider;
   provide the first instance of the first computing resource to a first tenant of a plurality of tenants utilizing a computing system;
   register the first instance of the first computing resource as a further computing resource provider;
   provide a second computing resource deployed by the further computing resource provider to a second tenant of the plurality of tenants responsive to a request of the second tenant when the second computing resource is available and sharable with the second tenant; and
   recursively-generate a second instance of the first computing resource responsive to the request from the second tenant when the second computing resource is not available or the second computing resource is not sharable with the second tenant.

2. The non-transitory computer-readable medium of claim 1, further comprising instructions executable by the processing resource to determine that the second computing resource is sharable with the second tenant based on a first cloud service agreement (CSA) associated with the first tenant and a second CSA associated with the second tenant, wherein the computing system is a cloud-based computing system.

3. The non-transitory computer-readable medium of claim 1, wherein recursively-generating the second instance of the first computing resource is based on a capability of the first computing resource.

4. The non-transitory computer-readable medium of claim 1, further comprising instructions executable by the processing resource to:
offer the first computing resource based on capabilities of the computing system;
deploy the first computing resource as a component of a computer service;
provision the deployed first computing resource per tenant among the plurality of tenants.

5. The non-transitory computer-readable medium of claim 1, wherein providing the second instance of the first computing resource to the second tenant is based on providing a computing service to the second tenant, and further storing instructions executable by the processing resource to eliminate the second instance of the computing resource responsive to termination of the computing service.

6. The non-transitory computer-readable medium of claim 5, wherein providing the computing service to the second tenant includes providing an indication of the second tenant associated with the computing service.

7. The non-transitory computer-readable medium of claim 1, further comprising instructions executable by the processing resource to partition the first instance of the first computing resource to create the further computing resource provider.

8. The non-transitory computer-readable medium of claim 1, wherein the registering comprises registering a capability of the first instance of the first computing resource.

9. The non-transitory computer-readable medium of claim 8, wherein registering the capability of the first instance of the first computing resource comprises registering a type of the further computing resource provider.

10. The non-transitory computer-readable medium of claim 8, wherein registering the capability of the first instance of the first computing resource comprises registering a command available for the further computing resource provider, the command useable by an application to communicate with the first instance of the first computing resource.

11. The non-transitory computer-readable medium of claim 8, wherein the capability comprises an ability to create or modify the first instance of the first computing resource.

12. A system comprising:
a processor; and
a non-transitory computer-readable medium having instructions executable on the processor to:
receive, from a first tenant of a computing system comprising a multi-tenant environment, a request for a computer service including use of a computing resource;
instantiate a first instance of the computing resource responsive to receiving the request from the first tenant;
register the first instance of the computing resource as a further computing resource provider; and
provide a second computing resource to a second tenant of the computing system responsive to a second request for the computing service from the second tenant, the second computing resource provided by the further computing resource provider.

13. The system of claim 12, wherein the instructions are executable on the processor to register the first instance of the computing resource pursuant to a cloud service agreement (CSA).

14. The system of claim 13, wherein the instructions are executable on the processor to provide the second computing resource to the second tenant in response to determining that the second computing resource is sharable with the tenant based at least partially on Quality of Service criteria in the CSA.

15. The system of claim 12, wherein the instructions are executable on the processor to partition the first instance of the computing resource to create the further computing resource provider.

16. The system of claim 12, wherein the registering comprises registering a capability of the first instance of the computing resource, the capability comprising an ability to create or modify the first instance of the computing resource.

17. A method executed by a system comprising a hardware processor, comprising:
processing a first request for a first computing service from a first tenant of a plurality of tenants utilizing a computing system;
providing a first instance of a computing resource to the first tenant in response to the first request;
registering the first instance of the computing resource as a further computing resource provider;
processing a second request for a second computing service from a second tenant of the plurality of tenants;
in response to the second request:
providing a second computing resource deployed by the further computing resource provider to the second tenant when the second computing resource is available and sharable with the second tenant; and
instantiating a second instance of the first computing resource when the second computing resource is not available or the second computing resource is not sharable with the second tenant.

18. The method of claim 17, further comprising:
deploying the first instance of the computing resource as an offering of the further comprising resource provider, wherein the offering is sharable with the plurality of tenants based on tenant information.

19. The method of claim 17, further comprising partitioning the first instance of the computing resource to create the further computing resource provider.

20. The method of claim 17, wherein the registering comprises registering a capability of the first instance of the computing resource, the capability comprising an ability to create or modify the first instance of the computing resource.

* * * * *